United States Patent
Brady, Jr.

(10) Patent No.: US 6,733,838 B2
(45) Date of Patent: May 11, 2004

(54) ROBUST NONTOXIC ANTIFOULING ELASTOMERS

(75) Inventor: Robert F. Brady, Jr., Gaithersburg, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 22 days.

(21) Appl. No.: 10/396,392

(22) Filed: Mar. 26, 2003

(65) Prior Publication Data

US 2003/0190482 A1 Oct. 9, 2003

Related U.S. Application Data

(62) Division of application No. 09/964,547, filed on Sep. 28, 2001.

(51) Int. Cl.[7] .................................................. B05D 3/06
(52) U.S. Cl. .................................................. 427/385.5
(58) Field of Search ...................................... 427/385.5

(56) References Cited

U.S. PATENT DOCUMENTS

| | | |
|---|---|---|
| 4,157,358 A | 6/1979 | Field et al. |
| 4,477,643 A | 10/1984 | Keller |
| 5,399,210 A | 3/1995 | Miller |
| 5,449,553 A | 9/1995 | Griffith |
| 5,656,720 A | 8/1997 | Schlueter et al. |

OTHER PUBLICATIONS

Honeychuck et al, Chemistry of Materials, 5(9), pp 1299–1306, 1993.*

* cited by examiner

*Primary Examiner*—Erma Cameron
(74) *Attorney, Agent, or Firm*—George A. Kap; John J. Karasek

(57) ABSTRACT

The invention herein pertains to a method for reducing adhesion of marine organisms to a substrate and an article that is a substrate having thereon a solid coating of a fluorinated polyurethane elastomer. The elastomer is tough and has antifouling and release properties in reference to marine organisms. The method includes the steps of providing a liquid mixture of the fluorinated polyurethane elastomer, applying the elastomer mixture to said substrate, and curing the elastomer mixture to a solid coating of the fluorinated polyurethane elastomer, the elastomer having surface energy (which is a function of fluorine content) of 15–30 milli $J/m^2$, Young's modulus of elasticity of 2–15 MPa, and fluorine content of 3–25%.

12 Claims, No Drawings

ROBUST NONTOXIC ANTIFOULING ELASTOMERS

This application is a divisional of U.S. application Ser. No. 09/964,547 filed Sep. 28, 2001, has been inserted as the first paragraph of the specification.

BACKGROUND OF THE INVENTION

1. Field of the Invention

This invention relates to a fluorinated polyurethane elastomer disposed on a substrate and to a process for its preparation and application, which elastomer can be used as a tough coating on a water craft with antifouling and release properties relative to marine organisms.

2. Background and Prior Art Description

All surfaces made by humans and immersed in water, particularly seawater, become covered with marine organisms. The diversity of these organisms and the environments in which they live create complex problems that any useful antifouling coating must overcome. The problem is most acute for ships because fouling organisms add weight and hydrodynamic drag, increase fuel consumption, speed up corrosion of the hull, and decrease speed, range and maneuverability.

To prevent the formation of a fouling layer, antifouling paints typically incorporate compounds which are toxic at low concentrations to most forms of fouling. However, these compounds persist in water and cause deformation in many kinds of sea life. The International Maritime Organization, a unit of the United Nations, approved in November of 1999 a resolution to phase out and eventually prohibit the use of toxic organotin derivatives in antifouling paints. The resolution includes a deadline of Jan. 1, 2003 for the new application of organotins acting as antifoulants on ships, and a second deadline of Jan. 1, 2008 for the complete prohibition and removal of antifouling paints containing organotins. Several countries, including France and Japan, and some states in the USA, have already banned organotins in antifouling paint for most ships.

Nontoxic coatings intended to succeed toxic coatings have been investigated for many years. However, every nontoxic coating put into water fouls. Therefore, because one cannot as yet completely stop settlement on nontoxic coatings, the coatings are designed in a way that significantly limits the strength of the bond to fouling, making the bond so weak that it can be broken by the weight of the fouling or by the motion of a ship through water of at least about 20 miles per hour.

Toxicity, as used herein, pertains to the ability of a coating to kill marine organisms attached to it, or to repel the organisms seeking to attach to it. Toxic coatings may have other effects, such as illness, deformity, or reproductive failure on marine organisms.

Two types of coatings are preeminent. Fluorinated coatings are tough, have low surface energy and resist fouling, but ultimately form a tight bond to fouling. The joint between fouling and a fluorinated coating fails in shear, i.e., fouling is pushed off and not peeled off, which is a relatively high-energy process, without damage to the coating. Silicone coatings, on the other hand, are soft, relatively weak, and are easily damaged or torn by marine debris. Because their surface energy is higher than that of fluoropolymers, they form a somewhat stronger bond with fouling. Application of force to the joint deforms the rubbery silicone and the resin peels away from the marine organism in a process which is slower but requires less energy than shear. In the past, only silicone elastomers have demonstrated foul resistance and foul release; hydrocarbon and fluorocarbon elastomers have not.

U.S. Pat. No. 5,449,553 to Griffith discloses a nontoxic antifouling coating on a substrate, such as a ship's hull, which includes a two-component system of a release layer bonded to a bonding layer, with the bonding layer bonded to the substrate. The bonding layer is a silicone rubber that contains a toughening ingredient and is a reaction product of an organopolysiloxane containing terminal silicon-bonded hydroxyl groups and a polymerizable vinyl aromatic ingredient. The release layer is a silicone rubber that is a reaction product of an organopolysiloxane containing terminal silicon-bonded hydroxyl groups. The bonding layer is tougher than the release but its release property is inferior to that of the release layer.

U.S. Pat. No. 4,157,358 to Field et al discloses random fluorinated epoxy and urethane resins that are reaction products of a bis(2-hydroxyhexafluoro-2-propyl)benzene, a linear unsaturated fluorinated diol, and epichlorohydrin. The resins can be crosslinked with a polyisocyanate to form highly fluorinated films, coatings, adhesives, and structural materials having exceptional heat, light and chemical resistance.

OBJECTS AND BRIEF SUMMARY OF THE INVENTION

It is an object of this invention to provide a one-component coating on a substrate, which coating combines the best features of fluorinated and silicone adhesion-resistant coatings for antifouling and release of marine organisms.

Another object of this invention is a nontoxic coating that does not incorporate any fugitive ingredient and thus does not leach anything into the environment.

Another object of this invention is a coating that is tough or robust and which is not damaged by impact, abrasion and mechanical abuse nor is damaged by hydrolytic or chemical attack, sunlight or heat.

Another object of this invention is a fluorinated polyurethane elastomeric coating that can be applied in one operation to any desired thickness in the range of 25–12,500 microns (0.001–0.5").

Another object of this invention is preparation of a fluorinated polyunsaturated elastomer that has sufficient toughness and antifouling and release properties with respect to marine organisms for use as a coating on a substrate that is submerged in water.

These and other objects of this invention can be attained by a fluorinated polyurethane elastomer that is prepared by reacting in a conventional way a polyol base component with a polyisocynate curing agent and then applying the liquid mixture onto a substrate to produce an elastomeric reaction product. The modulus, surface energy, and fluorine content of the elastomer should be carefully controlled.

DETAILED DESCRIPTION OF THE INVENTION

The tough and nontoxic elastomeric antifouling and release coating described herein combines the best features of fluorinated and silicone adhesion-resistant coatings. The coating is a tough fluorinated elastomeric coating which tolerates no more than a weak or imperfect joint between a fouling marine organism and itself, a joint that is predisposed to early and easy failure in peel. The elastomer coating has low surface energy and resists the attachment of fouling; it has a low modulus of elasticity which, together with low surface energy, correlate to provide sufficient toughness and foul resistant and release of fouling properties; and it can be applied in a thickness which favors failure of the fouling-coating joint by peel. The elastic modulus of the coating also contributes to the failure of the fouling-coating joint by peel.

The coating is prepared using conventional polyurethane technology using particular ingredients and parameters. The fluorinated polyurethane elastomer coating is formed from two liquid components, namely, a polyol base component and a curing agent, that are mixed immediately before use and which cure to form a solid rubbery elastomer.

The fluorinated polyurethane elastomer coating can be prepared by the reaction of a polyol in the base component with a polyisocyanate in the curing agent. Fluorine can be present in either or both polyol or polyisocyanate. A wide variety of fluorinated and unfluorinated polyols, and fluorinated and unfluorinated di-, tri- and polyisocyanates is available commercially for this purpose. The proportion of starting materials is chosen in order to control the crosslink density of the polymer, which in turn controls both its degree of elasticity and its resistance to physical abuse.

The base component, containing a polyol, or a mixture thereof, and the curing agent, containing an isocyanate, or a mixture thereof, are prepared separately. The base component and the curing agent can be mixed and poured into a mold, mixed and sprayed from a spray gun, sprayed with a plural-component spray gun which mixes the components in the gun tip, or applied in any other appropriate manner.

A reaction of an alcohol and an isocyanate to produce a urethane is as follows, where reaction I is that of an alcohol and an isocyanate to produce urethane; reaction II is between a diol and a diisocyanate to produce a linear, uncrosslinked polyurethane; and reaction III is that of a triol and a diisocyanate to produce a partially crosslinked polyurethane:

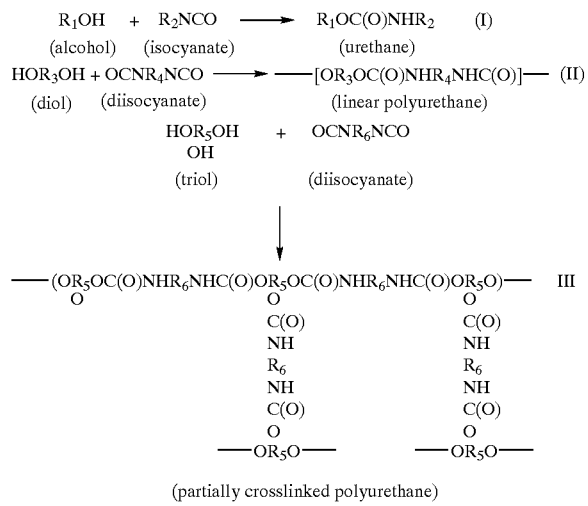

(partially crosslinked polyurethane)

where $R_1$, $R_2$, $R_3$, $R_4$, $R_5$ and $R_6$ are organic radicals.

By controlling the cross-link density of the polyurethane, as by varying the amount of the curing agent, a fluorinated polyurethane elastomer can be obtained that will have sufficient toughness and foul-release and antifouling properties for purposes herein. In order to obtain the desired properties, the coating should be prepared from a fluorinated and/or unfluorinated polyol, which includes diols and triols, and a fluorinated and/or unfluorinated polyisocyanates, which includes diisocyanates and/or triisocyanates, so that the ratio of NCO/OH is about 1–2, and more preferably 1–1.5. If the NCO/OH ratio is below about 1, then the reaction proceeds according to reaction II, above, which produces a linear polyurethane elastomer which is not crosslinked and does not have the desired toughness to serve as a coating herein. The ratio should be at least about 1 in order for the preparation reaction to proceed by reaction III which can produce a partially cross-linked fluorinated polyurethane with sufficient toughness to serve as a coating herein.

The ratio of NCO/OH should be below about 2 so that the resulting fluorinated polyurethane is not only tough enough but also has sufficient antifouling and release properties to serve as a coating herein. If too much of the curing agent is used, then the polyurethane can become completely cross-linked and although its toughness may be more than sufficient for purposes herein, its antifouling and release properties may be insufficient. There is a balance of properties herein which can be attained, inter alia, by using a certain proportion of starting materials to control the cross-linking density of the polyurethane, which in turn controls its elasticity and resistance to physical abuse as well as allows for its antifouling and release properties. By using a proportion of a polyol and a polyisocyanate so that the ratio of NCO/OH is below about 2, the preparation reaction proceeds according to reaction III whereby a partially cross-linked fluorinated polyurethane can be produced with desirable toughness and antifouling and release properties. The preferred ratio of NCO/OH is 1–1.5 and the optimum ratio appears to be about 1.2.

The NCO/OH ratio of 1.2 has the highest hardness and the highest modulus of elasticity of any material tested. This indicates that it will have the greatest resistance to physical damage and the easiest fouling release. This combination of properties in one material was merely additive but synergistic and unexpected.

Another criterion for a desirable coating is its fluorine content, particularly for the antifouling and release properties. As already noted, the fluorine can be either on the polyol or the polyisocyanate, or both. The fluorinated polyurethane elastomer of this invention should have fluorine content, on molar basis, of 3–25%, and preferably 6–18%, and more preferably 9–10%. If the minimum fluorine amount is exceeded in that the amount of fluorine is below about 3%, then antifouling and release properties of the fluorinated polyurethane elastomer will be insufficient for purposes herein. The upper amount of fluorine is governed by economics, and an elastomer with more than about 25% fluorine will be impractical because it would be too expensive.

The ratio of diol to trio is important in the context of preparing coatings with desirable toughness and antifouling and release properties. Based on data observed, the percent of trifunctional OH groups in the base component should be about 10–40%, preferably 18–32%, and more preferably 23–27%. Presence of trifunctional OH enables preparation by reaction III, above, which makes possible the partial cross-linking to take place and imparts the desirable toughness to the elastomer. If content of trifunctional OH is below about 10%, the coating is too weak, whereas if it is above about 40%, the coating is too rigid and inelastic.

To discourage fouling of the coating, i.e., the fluorinated polyurethane elastomer, in dry or wet form, the coating should have a surface energy of 15–30 milli J/m², preferably 20–29 m J/m², and more preferably 25–27 m J/m²; and Young's elastic modulus of 2–15 MPa, preferably 2–10 MPa, and more preferably 3–7 MPa. Both surface energy and the modulus of elasticity correlate with the performance of the coating as foul-resistant and release of fouling with toughness. Typically, when the amount of the polyol is reduced, the modulus of elasticity also declines.

It was not expected that the combination of low surface energy and low modulus of elasticity would give sufficient anti-fouling and foul release properties. There is synergy here between fluorine content, surface energy and elastic modulus, provided that each is kept within a narrow range. Low surface energy minimizes fouling and low modulus of elasticity makes it easier to get it off.

With respect to the reaction of a polyol and a polyisocyanate to produce the polyurethane elastomer, as generally depicted by the reaction III, above, a suitable polyol, which can be fluorinated or unfluorinated, has molecular weight of about 400–1000 and OH functionality of 2 or more, such as 2 or 3. A suitable fluorinated polyol is the unsaturated fluorinated polyol disclosed in U.S. Pat. No. 4,157,358. This polyol contains a backbone comprised of carbon-carbon and carbon-oxygen bonds to impart chemical stability, sufficient hydroxyl groups to form an elastomer, and trifluoromethyl groups evenly spaced along the backbone to reduce surface energy and shield the backbone from chemical attack. This material is made by 21$^{st}$ Century Coatings under the trade name WC-10, is supplied as a 70% weight/weight solution in n-butyl acetate/xylene, and the solution has an equivalent weight of 535.

Other suitable fluorinated polyols include Fluorobase C from Ausimont Chemical, supplied as a 50% w/w solution in n-butyl acetate with equivalent weight of 906 and fluorine content of 27%. Fluorobase C is a difunctional OH-terminated perfluoropolyether of the general structure.

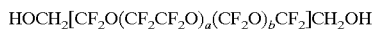

$$HOCH_2[CF_2O(CF_2CF_2O)_a(CF_2O)_bCF_2]CH_2OH$$

Another suitable polyol is polypropylene glycol. It has a viscosity of 80 cP at 25° C., a number average molecular weight of 425, and an equivalent weight of 212. It contains no fluorine.

The polyol may be typically dissolved in a solvent or a mixture thereof to give desirable viscosity or workability. A suitable solvent is volatile and non-reactive with the NCO groups of the curing agent. Suitable solvent for the polyols include xylene, butyl acetate and other esters, aromatic hydrocarbons, toluene, ethers, and the like. Alcohols and amines are not considered to be suitable solvents since OH and NH groups react with the NCO groups of the curing agent. DMSO is also not considered to be a suitable solvent for purposes herein since it is not volatile and would not evaporate from the coating.

A suitable isocyanate is one that contains 2 or more NCO groups, such as 2. A suitable fluorinated isocyanate is Fluorobase Z from Ausimont Chemical which is supplied as a 60% solution in n-butyl acetate and has equivalent weight of 1200 and viscosity of 200 cP at 25° C. Fluorobase Z is a difunctional NCO-terminated perfluoropolyether made by reacting Fluorobase C with the triisocyanurate of hexamethylene diisocyanate. Another suitable fluorinated diisocyanate can be made by reacting Fluorobase C with isophorone diisocyanate. Suitable non-fluorinated polyisocyanates are made from hexane-1,6-diisocyanate or isophorone diisocyanate. Polyisocyanates made from hexane-1,6-diisocyanate include Desmophen N-3000, Desmophen N-3100, and Desmophen N-3200, made by the Bayer Corporation. Polyisocyanates made from isophorone diisocyanate include Vestanat, made by Degussa-Huels Corporation.

In a preferred embodiment, the base polyol component contains a diol, a triol and a catalyst and is prepared by thoroughly mixing the following materials in the indicated proportions:

1) 6.42 grams of fluorinated polyol WC-10 as a 70% w/w solution in n-butyl acetate xylene;

2) 0.41 g of trimethylol propane propoxylate having molecular weight of 308 and an equivalent weight of 103 (CA Registry No. 25723-16-4); and 3) 0.04 g dibutyltin dilaurate (DBTDL) catalyst having molecular weight of 631 (CA Registry No. 77-58-7).

The DBTDL catalyst is used to speed up the reaction between polyol and curing agent so that the reaction can be completed in 5 minutes to 8 hours. In absence of a catalyst, the reaction may take several days. Sufficient amount of a suitable metal salt catalyst is used to carry out the reaction in 5 minutes to 8 hours, preferably 2–4 hours.

The base polyol component comprised of ingredients 1, 2 and 3, identified above, was prepared by mixing the ingredients to produce a pourable liquid having viscosity of 2000–12,500 cP at 40° C.

In a preferred embodiment, the curing agent contains a diisocyanate oligomer which is prepared by using the following product in the indicated proportion:

1) 9.60 g diisocyanate prepolymer, a poly(propylene glycol) terminated with toluene-2,4-diisocyanate having weight average molecular weight of about 1000, viscosity of 12,500 cP at 40° C., and an average isocyanate content of 8.4% by weight (CA Registry No. 9057-91-4).

The base polyol component and the curing agent are mixed for about 20 minutes to produce a liquid polyurethane elastomer and then applied to a substrate by spraying. Sufficient time is provided for mixing and reacting the base polyol component and the curing agent, which typically takes less than about ½ hour and generally about 10 minutes, although it can be accomplished in 5–30 minutes, depending on sample size. The liquid polyurethane elastomer should have sufficient working time to be applied to a substrate, allowing air bubbles and solvent, if any is used, to escape before cure takes place to form a rubbery solid coating. The working time, after mixing the base polyol and the curing agent, is typically ¼–2 hours, and more typically ½–1 hour. Curing time is typically overnight or until tack-free.

Cured thickness of the coating applied to a substrate is typically 500–6250 microns, more typically 1250–5000 microns. The coating should be thick enough to permit the foulant to be removed from a substrate by peel. If thickness of the coating is too small, the amount of elastomer between foulant and substrate is insufficient to impart a rubbery nature to the surface and disguise the rigidity of the substrate. The foulant, in effect, experiences a rigid surface and the bond between foulant and surface must fail in shear. For this reason, thickness of the coating should be such as to allow separation between the substrate and the foulant to take place by peel, which typically requires less force than shear. The coating thickness ranges given above, will allow separation of a foulant, particularly a marine foulant, from a substrate to take place in peel rather in shear. Very thick coating s would be ideal, for they would completely mask the properties of the substrate and ensure failure of the foulant-substrate joint by peel. However, thicknesses beyond the upper ranges given above are economically impractical. Since a typical coat of paint is about 75 microns thick, it should be apparent that even the thinnest effective layer of the coating herein is relatively thick, compared to a paint coating.

The coating is applied onto a substrate, which is generally steel, which is typically coated with a 2-component epoxy polyamide primer layer. The primer thickness is typically on the order of 25–125 microns. The coating can be applied onto a substrate, as by spraying, or it can be in the form of a film secured to a substrate.

Lifetime of the coating of this invention is on the order of 10 years.

EXAMPLE 1

Pursuant to the invention, a series of fluorinated polyurethane elastomers were made to evaluate versatility of the synthesis and performance of the coatings.

The curing agent (Part A) and the base component (Part B) were as follows:

---

Part A (curing agent)

9.60 g diisocyanate prepolymer, a poly(propylene glycol) terminated with toluene-2.4-diisocyanate having weight average molecular weight of about 1000, viscosity of 12,500 cP at 40° C., and an average isocyanate content of 8.4% by weight    7.2–12.0 g Part B (base component)

1) 6.42 grams of fluorinated polyol WC-10 as a 70% w/w solution in n-butyl acetate xylene;    6.42 g
2) 0.41 g of trimethylol propane propoxylate having molecular weight of 308 and an equivalent weight of 103; and
3) 0.04 g dibutyltin dilaurate (DBTDL) catalyst having molecular weight of 631.

---

Proportion of triol in the above base component was kept constant at 25% and the NCO/OH ratio in the above reactions was either 1.1, 1.2 or 1.3. The above base component and the above curing agent were made separately, blended thoroughly, poured into a mold and allowed to cure at room temperature for 72 hours, producing tough, translucent elastomers light yellow in color. The Durometer hardness was measured with a Shore A Hardness tester, and is shown in Table 1, below.

Contact angle measurements were made with an AST 2500 Video Contact Angle System. Drops of triply-distilled water, methylene iodide, and formamide were applied separately to the elastomer, and the contact angle between each drop and the surface was measured immediately. The measured contact angles and the surface tensions of the test liquids were used to calculate the surface energy by the geometric mean method. The dispersive component $\gamma_d$ polar component $\gamma_p$, and total surface energy $\gamma_T$ of the elastomers are shown in Table 1, below. These values for the fluorinated polyurethane elastomers are well below corresponding values of $\gamma_T$ for commodity polymers such as polystyrene ($\gamma_T$=40 dynes/cm) and polyethylene ($\gamma_T$=33 dynes/cm), indicating that the trifluoromethyl groups are aggregated at the surface.

Hardness and Young's elastic modulus were measured with a Fisherscope H-100 Microindenter which senses both load and displacement. The applied load on a Vickers four-sided pyramid indenter was increased incrementally in 30 1-second steps to three maximum load levels of: 10, 30 and 100 mN. WinUMIS 2 software was used for analysis of the data. The values for universal hardness Hu, Young's elastic modulus E, and recovery are shown in Table 1, below:

TABLE 1

Physical Properties of the Fluorinated Polyurethane Elastomers

| NCO/OH ratio | $Y_d$ dy/cm | $Y_p$ dy/cm | $Y_T$ dy/cm | Hu dy/cm | E Mpa | Recovery % | Shore A Hardness |
|---|---|---|---|---|---|---|---|
| 1.1 | 21.8 | 3.4 | 25.2 | 0.36 | 4.8 | 72 | 62 |
| 1.2 | 24.9 | 3.2 | 27.1 | 0.49 | 6.2 | 75 | 62 |
| 1.3 | 24.9 | 3.2 | 27.1 | 0.31 | 3.9 | 76 | 65 |

Seawater immersion tests were conducted in the Chesapeake Bay at Deale, Md. beginning in May of 2000. The elastomers were attached to polymethyl methacrylate (PMMA) panels with epoxy cement and immersed in still water to a depth of 1–4 feet, depending on tides. Fouling was assessed at about two-month intervals. At each evaluation, the extent of fouling, ease of cleaning, residual fouling, and integrity of the coating were judged and rated on a scale of 0 (best) to 5 (worst). Data is given in Table 2, below.

TABLE 2

Immersion Testing of the Fluorinated Polyurethane Elastomers

| NCO/OH ratio | Fouling | Ease of Cleaning | Residual Fouling |
|---|---|---|---|
| Jun. 26, 2000 | | | |
| 1.1 | 2 | 1 | 0 |
| 1.2 | 3 | 0 | 0 |
| 1.3 | 3 | 0 | 0 |
| Aug. 15, 2000 | | | |
| 1.1 | 3 | 1 | 0 |
| 1.2 | 3 | 1 | 0 |
| 1.3 | 3 | 1 | 0 |
| Oct. 3, 2000 | | | |
| 1.1 | 0 | 0 | 0 |
| 1.2 | 2 | 0 | 0 |
| 1.3 | 2 | 0 | 0 |

The above Table 2 shows that, at each inspection, all elastomers had accumulated fouling on their surfaces. Fouling included shell fouling and soft fouling. Shell fouling is fouling by barnacles, mussels and clams whereas soft fouling is fouling by grasses and weeds. The amoung of fouling on the elastomers was significantly less than that on the PMMA panels to which they were attached. The elastomers were placed flat on the pier and washed with a garden hose at 15 psi water pressure. The force of water issuing from the hose was sufficient to remove all fouling from panels rated 0. Finger pressure was needed to remove fouling from all panels rated 1. In this way all of the panels were restored to the condition characteristic of new panels before testing.

EXAMPLE 2

This is an example that did not work because both its modulus and fluorine content were too high.

---

Part A

Fluorobase Z, 60% w/w solution in nBuOAc (viscosity of 200 cP at 20° C.)    23 g -continued

| Part B | |
|---|---|
| Fluorobase C, 50% w/w solution in nBuOAc (viscosity of 80 cP at 25° C.) | 10.9 g |
| Trimethylol propane propoxylate, MW$_{wt}$ 308 | 0.4 g |
| DBTDL catalyst | 0.1 g |

This had a NCO/OH ratio of 1.2, surface energy of 11.1 mJ/m$^2$, an elastic modulus of 1420, and a fluorine content of 38%. Cleaning required scraping with a metal or plastic tool, and some fouling could not be removed.

EXAMPLE 3

This is an example that did not work simply because it's fluorine content was too high.

| Part A | |
|---|---|
| Fluorobase Z, 60% w/w solution in nBuOAc viscosity of 200 cP at 20° C. | 23 g |
| Part B | |
| Propylene glycol, 80 cP at 25° C., MW of 425 | 2.5 g |
| Trimethylol propane propoxylate, MW 308 | 0.4 g |
| DBTDL catalyst | 0.06 g |

This had a NCO/OH ratio of 1.2, surface energy of 9.1 mJ/m$^2$, an elastic modulus of 2.9 Mpa, and a fluorine content of 36%. Cleaning required moderate effort with a sponge or cloth, and a small amount of fouling could not be removed.

EXAMPLE 4

This is an example that did not work simply because it's modulus was too high.

| Part A | |
|---|---|
| Polypropylene oxide, toluene diisocyanate terminated, MW of about 1000, viscosity of 12,500 cP at 40° C., and containing 8.4 weight % isocyanate | 9.6 g |
| Part B | |
| Fluorobase C, 50% w/w solution in nBuOAc | 10.9 g |
| Trimethylol propane propoxylate, MW 308 | 0.4 g |
| DBTDL catalyst | 0.05 g |

This had a NCO/OH ratio of 1.2, surface energy of 29.5 mJ/m$^2$, an elastic modulus of 18 MPa, and a fluorine content of 9%. Cleaning required scraping with a metal or plastic tool, and all fouling could be removed.

While presently preferred embodiments have been shown of the novel fluorinated polyurethane elastomers disposed on a substrate and a process for preparing the elastomers, and of the several modifications discussed, persons skilled in this art will readily appreciate that various additional changes and modifications may be made without departing from the spirit of the invention as defined and differentiated by the following claims.

What is claimed:

1. A method for reducing adhesion of marine organisms to a substrate comprising the steps of:
   (a) providing a liquid mixture of a fluorinated polyurethane elastomer,
   (b) applying the elastomer mixture to said substrate, and
   (c) curing the elastomer mixture to a solid coating of the fluorinated polyurethane elastomer, the elastomer having surface energy of 15–30 milli J/m$^2$, Young's modulus of elasticity of 2–15 MPa, and fluorine content of 3–25%.

2. The method of claim 1 wherein surface energy of the elastomer is 20–29 mJ/m$^2$, its Young's modulus of elasticity is 2–10 MPa and its fluorine content is 6–18%.

3. The method of claim 1 wherein surface energy or the elastomer is 25–27 mJ/m$^2$ and its Young's modulus of elasticity is 3–7 MPa, and its fluorine content is 9–10%.

4. The method of claim 1 wherein the elastomer is a reaction product of a base component comprising a polyol, or a mixture thereof, with a curing agent containing a diisocyanate, or a mixture thereof, the base component contains a mixture of at least one diol and at least one triol.

5. The method of claim 4 wherein the ratio of the NCO/OH groups in the curing agent and the base component is below 2.

6. The method of claim 4 wherein the NCO/OH ratio in the curing agent and the base component is 1–1.8 and amount of trifunctional OH is 18–32 mol percent.

7. The method of claim 4 wherein the NCO/OH ratio in the curing agent and the base component is 1–1.5 and amount of trifunctional OH is 23–27 mol percent.

8. The method of claim 6 wherein the elastomer is nontoxic to marine organisms, contains no fugitive ingredients, is partially cross-linked and is in the form of a pourable liquid, before curing, that has a working life of 15 minutes to 8 hours.

9. The method of claim 8 wherein the substrate has a coating of a primer thereon onto which the elastomer is applied.

10. The method of claim 9 wherein the base component includes a metal salt catalyst.

11. The method of claim 9 wherein the base component is in a solvent solution, contains a mixture of at least one diol and trimethylol propane propoxylate, and a metal salt catalyst.

12. The method of claim 11 wherein the curing agent includes a diisocyanate prepolymer and poly(propylene glycol) terminated with toluene-2,4-diisocyanate.

* * * * *